(12) United States Patent
Casses et al.

(10) Patent No.: US 8,926,370 B2
(45) Date of Patent: Jan. 6, 2015

(54) ELECTRICAL CONNECTOR AND ELECTRICAL EQUIPMENT COMPRISING THE SAME

(75) Inventors: Claude Casses, Clevilliers (FR); Davide Testa, Montanaro (IT)

(73) Assignee: Delphi International Operations Luxembourg S.A.R.L. (LU)

( * ) Notice: Subject to any disclaimer, the term of this patent is extended or adjusted under 35 U.S.C. 154(b) by 172 days.

(21) Appl. No.: 13/806,308

(22) PCT Filed: Jun. 17, 2011

(86) PCT No.: PCT/EP2011/060167
§ 371 (c)(1),
(2), (4) Date: Feb. 11, 2013

(87) PCT Pub. No.: WO2011/161026
PCT Pub. Date: Dec. 29, 2011

(65) Prior Publication Data
US 2013/0137313 A1    May 30, 2013

(30) Foreign Application Priority Data

Jun. 24, 2010  (WO) .................. PCT/IB2010/001934
Dec. 17, 2010  (WO) .................. PCT/IB2010/003523

(51) Int. Cl.
| H01R 25/00 | (2006.01) |
| H01R 13/62 | (2006.01) |
| B60L 3/00 | (2006.01) |
| H01R 12/71 | (2011.01) |
| H01R 43/00 | (2006.01) |
| H01R 13/703 | (2006.01) |
| H01R 13/74 | (2006.01) |

(52) U.S. Cl.
CPC .............. *H01R 13/62* (2013.01); *B60L 3/0069* (2013.01); *H01R 12/716* (2013.01); *H01R 43/00* (2013.01); *H01R 13/7036* (2013.01); *H01R 13/748* (2013.01)
USPC ......................................... 439/638; 439/76.2

(58) Field of Classification Search
USPC ........ 439/76.2, 176, 640, 650, 651, 652, 655, 439/181, 186, 187, 638
See application file for complete search history.

(56) References Cited

U.S. PATENT DOCUMENTS

| 4,799,893 | A  * | 1/1989 | Ogawa et al. ................ 439/76.2 |
| 6,227,908 | B1 * | 5/2001 | Aumeier et al. .......... 439/607.01 |
| 8,226,428 | B2 * | 7/2012 | Arnaud et al. ................ 439/252 |
| 2005/0054222 | A1 * | 3/2005 | Terunuma et al. ........... 439/76.2 |

FOREIGN PATENT DOCUMENTS

| EP | 1 041 675 A2 | 10/2000 |
| JP | 3-285524 | 12/1991 |
| WO | WO 2010/015641 A1 | 2/2010 |

* cited by examiner

*Primary Examiner* — Ross Gushi
(74) *Attorney, Agent, or Firm* — Robert J. Myers

(57) ABSTRACT

Electrical connector including at least one electrical power contact having a cross-section larger than 8 mm$^2$ and adapted to mate with a complementary connector. The at least one power contact includes a front end adapted to be electrically connected with a first complementary contact of said complementary connector. The at least one electrical power contact includes a back pin having a back pin extremity located at the opposite end of the power contact with respect to the front end and adapted to be electrically connected with a second complementary contact of a second connector.

19 Claims, 5 Drawing Sheets

US 8,926,370 B2

ELECTRICAL CONNECTOR AND ELECTRICAL EQUIPMENT COMPRISING THE SAME

FIELD OF THE INVENTION

The present invention relates to an electrical connector for use e.g. in electrical power equipment, in particular for vehicle.

The invention also relates to an electrical power equipment, adapted to be assembled with an electrical connector.

The invention also relates to an electrical power equipment assembly, a kit assembly and a manufacturing method for such a power equipment assembly.

STATE OF THE ART

Some electrical power equipments comprise a box enclosing a power circuit which is connected to the outside of the box by a connector. Traditionally, the connector is permanently fixed on the power circuit. For example, it is soldered, crimped or fastened by screw. Then, the power circuit with its one or several attached connectors, is introduced into the box. The box is made of two half parts. Each half part has a recess to form a half of a through hole. When the two halves of the box are assembled together, connectors are each surrounded by the wall of the box. The separation line between the two halves of the box passes through each hole of the wall used by the electrical connectors.

A drawback of such a power equipment assembling method is that the choice for a mechanical interface of the electrical connector must be done before closing of the power equipment box.

There is a need for a more flexible connectorisation of the power equipment.

SUMMARY OF THE INVENTION

The invention provides an electrical connector, a power equipment, a power equipment assembly and a manufacturing method that remedies to at least one of the above drawbacks.

A goal of the invention is to provide a more flexible design of electrical equipment assembly.

According to one aspect, an embodiment of the electrical connector comprises at least one electrical contact having a cross-section larger than 8 mm$^2$ and is adapted to mate with a complementary connector. The at least one contact comprises a front end adapted to be electrically connected with a first complementary contact of said complementary connector. The at least one electrical contact comprises a back pin having a back pin extremity located at the opposite end of the contact with respect to the front end and adapted to be electrically connected with a second complementary contact of a second connector.

Thanks to the connectable back pin extremity, the electrical connector can be assembled on a electrical equipment after the box of the equipment has been closed.

According to another aspect, an embodiment of a power equipment comprises a box enclosing an inner space, an electrical power circuit included in the inner space, and an electrical power contact which is electrically connected to the power circuit and connectable following a coupling axis with another power contact. The box comprises a wall provided with a through hole and attaching means adapted to attach an electrical connector body, said attaching means extending around the through hole. The electrical power contact is an inner electrical power contact located inside the inner space, and the coupling axis is passing through the through hole.

According to another aspect, an embodiment of the power equipment assembly comprises:
  a power equipment comprising a box having a wall enclosing an inner space and provided with a through hole,
  a complementary connector comprising a complementary contact,
  an electrical connector permanently fixed to the wall, adapted to mate with the complementary connector and comprising at least one electrical power contact which comprises a front end electrically connected with the complementary contact.

The power equipment comprises an inner electrical power contact located inside the inner space. The at least one electrical power contact comprises a back pin having a back pin extremity located at the opposite end of the power contact with respect to the front end and electrically connected with said inner electrical power contact.

In some other embodiments, one might also use one or more of the features as defined in dependant claims.

BRIEF DESCRIPTION OF THE DRAWINGS

Other characteristics and advantages of the invention will readily appear from the following description of some of its embodiments, provided as a non-limitative example, and of the accompanying drawings.

On the drawings.

Figure 1:
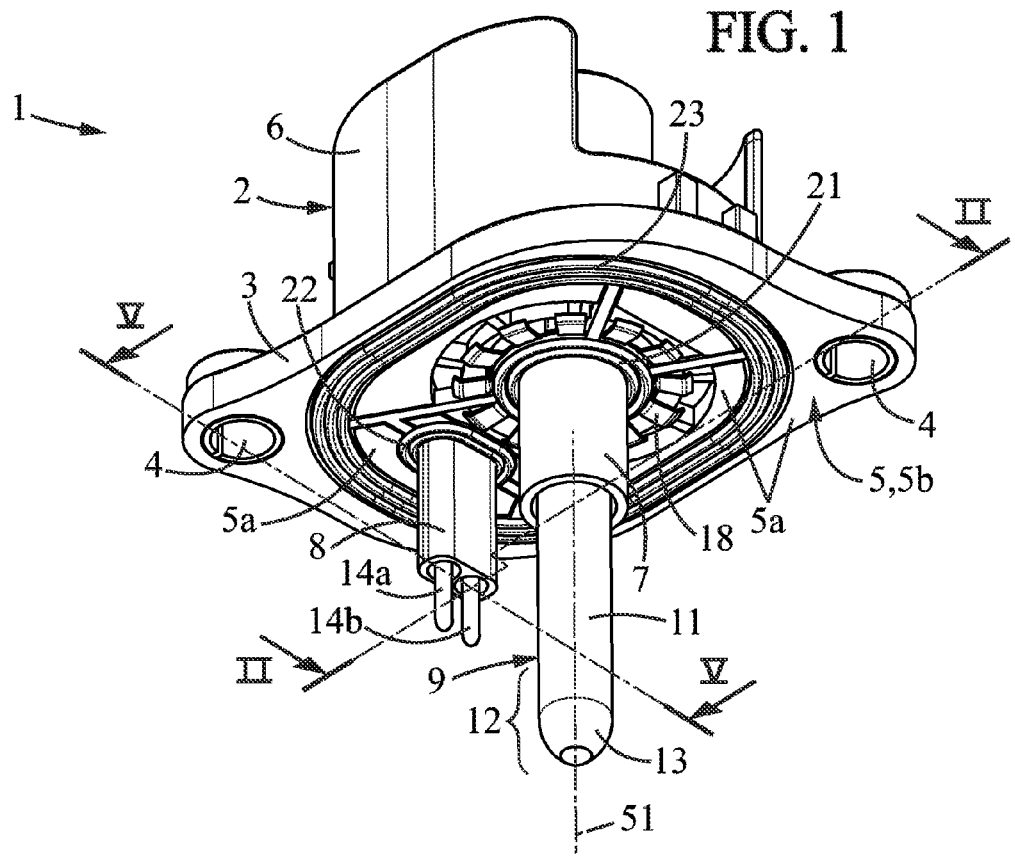
FIG. 1 is a perspective view of an embodiment of an electrical connector.
Figure 3:
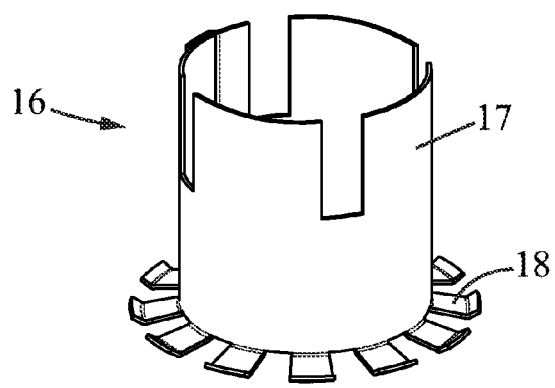
FIG. 3 is a perspective view of a shield of a connector of FIG. 1.
Figure 2:
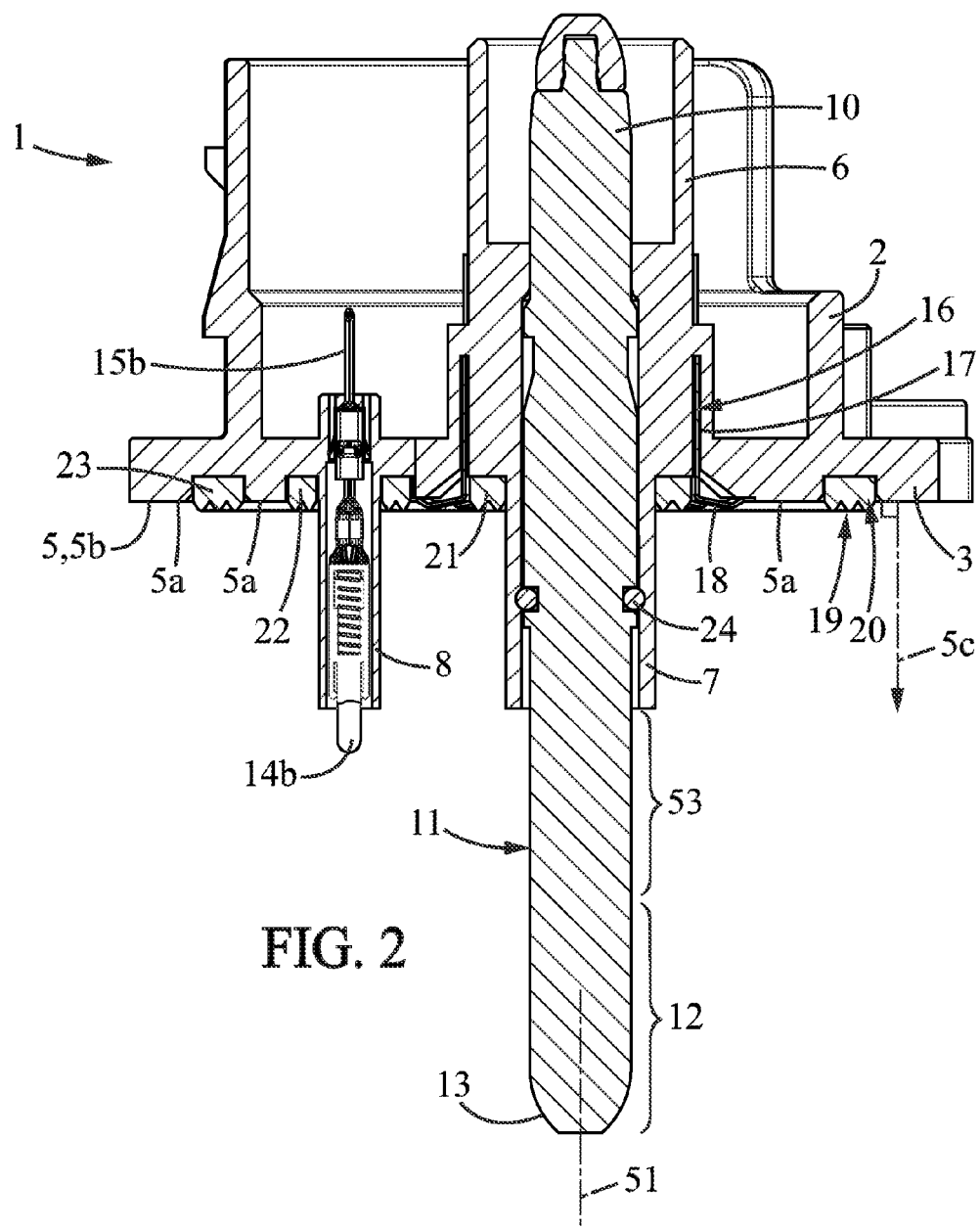
FIG. 2 is a longitudinal cut view according to plane II-II of FIG. 1.

As illustrated in the FIGS. 1, 2, 3, the electrical connector 1 comprises a main body 2 of a wall mounting type. The main body 2 comprises a flange 3 including two fixing holes 4 and a fixing face 5 adapted to be pressed again a wall 30 (see FIG. 5) in order to be permanently fixed to said wall. The main body 2 further comprises a mechanical mating portion 6 extending in one side of the fixing face 5 and a central protrusion 7 extending from the fixing face 5 towards a direction opposite to the mechanical mating portion 6 and substantially perpendicular to the fixing face 5. The main body 2 comprises an auxiliary protrusion 8 extending also from the fixing face 5 and perpendicular to the fixing face 5. The fixing face 5 comprises a plurality of fixing elements 5a, adapted to be in contact with a mounting surface 30a when the connector 1 is mounted on a wall 30. All of the fixing elements 5a extend along a fixing plane 5b. When the electrical connector 1 is mounted on the wall 30, the central protrusion 7 and the auxiliary protrusion 8 enter through respectively a central hole 31 and an auxiliary hole 32 (see FIG. 4). The electrical connector 1 is pressed against the wall 30 following a fixing direction 5c.

The electrical connector 1 further includes a power contact 9, made in an electrically conductive material like a copper alloy. With reference to FIG. 2; the power contact 9 comprises a front end 10 surrounded by the mechanical mating portion 6 and a back pin 11 mounted fixedly in the central protrusion 7 and extending from the central protrusion towards the fixing direction 5c. The back pin 11 has a back pin extremity 12 provided with a smooth longitudinal profile 13. The illustrated front end 10 is of a male type. However, it could be of a female type.

The electrical connector 1 further comprises two auxiliary back pins 14a,14b (only one is visible on FIG. 2). Each of the auxiliary back pins 14a,14b is spring retractable and slides inside the auxiliary protrusion 8, and is electrically connected to a corresponding signal contact 15a,15b fixedly mounted into the main body 2. The illustrated signal contacts 15a,15b are of a male type but they could be of a female type.

As shown in FIGS. 2 and 3, the electrical connector 1 further comprises an EMI shield 16, made of a metallic punched and folded sheet and having a main cylindrical part 17 inserted into corresponding annular spaces of the main body 2 so as to surround a bottom part of the front end 10. The EMI shield 16 further comprises contacting tongues 18 extending all around the power contact 9 in a substantially radial direction so as to electrically connect a conductive portion of the wall 30.

The electrical connector 1 further comprises humidity sealing means including a composite seal 20 providing an axial humidity seal between the main body 2 and the wall 30 when the connector is axially fastened on the wall 30 following the fixing direction 5c. as displayed in FIG. 2, the composite seal 20 comprises a central ring 21 surrounding the central protrusion 7, an auxiliary ring 22 surrounding the auxiliary protrusion 8 and an outside ring 23 surrounding the contacting tongues and both rings 21,22. The humidity sealing means further include an "o" ring seal 24 which provides a radial seal between the power contact 9 and the main body 2.

Figure 4:
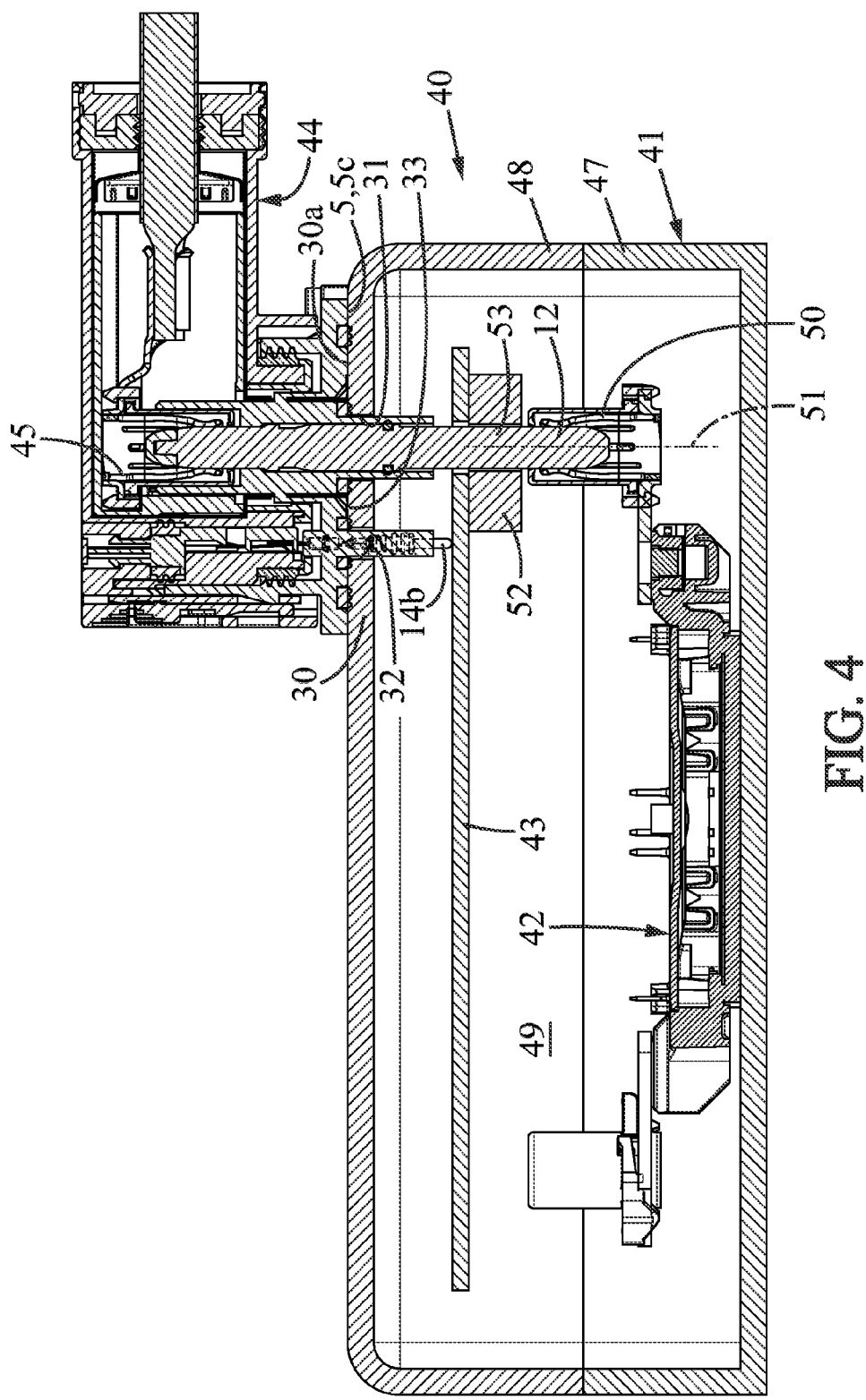
FIG. 4 is a section of an embodiment of power equipment.

As illustrated in FIG. 4, the power equipment 40 comprises a closed box 41 with a base 47 and a lead 48 defining an inner space 49. A power circuit 42 and a driving circuit 43 extend into the inner space 49 and are each attached to the box 41. The electrical connector 1 is mounted on the mounting surface 30a of the box 41 which defines the fixing direction 5c. The mounting surface 30a surrounds the wall 30 through which the central and auxiliary holes 31, 32 are drilled. A complementary connector 44 is mated with the mechanical mating portion 6 of the electrical connector 1 which is outside the box 41. The complementary connector 44 comprises a first complementary power contact 45 mechanically and electrically coupled with the front end 10 of the power contact 9.

The wall 30 of the closed box 41 is made with an electrically conductive material so as to provide an EMI shield around the power circuit 42 and the driving circuit 43. The outside surface of the box 41 is coated by an insulating layer such as a paint for example. The mounting surface 30a of the box 41 includes a non-coated area 33 extending around the central hole 31 such that the contacting tongues 18 of the EMI shield 16 are electrically connected with the conductive material of the box 41. The central ring 21 of the seal 20 extends radially inside the contacting tongues 18 and presses against the non-coated area 33. The non-coated area 33 extends radially inside the outside ring 23 so as to be protected against humidity contamination from the outside. Both central ring 21 and auxiliary ring 22 provide an atmosphere barrier between the non-coated area 33 and the inner space 49 of the box 41.

An inner electrical power contact 50 is mechanically attached and electrically connected to the power circuit 42 and extends inside the inner space 49 of the box 41. Such inner electrical power contact 50 is of a female type and includes a coupling axis 51 which is substantially in the alignment of the central hole 31 and is parallel to the fixing direction 5c. Therefore, the inner electrical power contact 50 is able to receive the back pin extremity 12 of the electrical connector 1. The inner electrical power contact 50 is a second complementary contact 50 connected to the power contact 9 of the electrical connector 1. The electrical connection between the electrical power contact 9 and the power circuit 42 can be provided after the closing of the box 41. In other words, the fact that the back pin 11 protrudes from the fixing face 5 towards the fixing direction 5c provides a blind connectable electrical connector 1.

The power contact 9, the first complementary power contact 45, the second complementary contact 50, as well as the back pin extremity 12 are intended to be power contacts suitable for feeding vehicles electrical engines. The current intensity through these contacts could be in the order of magnitude of several hundreds of Amperes. Conductive cross-sections are for example larger than 8 mm$^2$. It could be larger than 12 mm$^2$. It could be larger than 16 mm$^2$. It could be larger than 35 mm$^2$. The conductive cross-section can be comprised between 12 mm$^2$ and 80 mm$^2$, in particular between 16 mm$^2$ and 65 mm$^2$.

For power contacts of a male type, the conductive cross-section is intended to be the geometrical cross-section of the contact in the area close to the friction area with the corresponding female contact. For power contact of a female type, the conductive cross-section is intended to be the sum of the cross-section of each conductive spring tongues.

The signal contacts 15a,15b, as well as the corresponding back pins 14a,14b is intended to carry only few tenths of Amperes or less. The cross-section is mainly dictated by mechanical resistance reasons. In typical application, a conductive cross-section of these signal contacts is below 8 mm$^2$.

The illustrated back pin extremity 12 is of a male type and the inner electrical contact 50 is of a female type. However, it could be the opposite. The back extremity 12 of the pin could be of a female type, receiving an inner pin 50 attached to the power circuit 42. In both cases, the back extremity 12 of the pin is a first connection portion of the back pin 11 which cooperates with a second complementary connector 50 located inside the inner space 49.

The driving circuit 43 of the power equipment 40 is provided with a ring sensor 52 which is coaxial with the coupling axis 51 of the inner electrical power contact 50 and axially located between the inner electrical power contact 50 and an inner surface of the box 41 about the central hole 31. The back pin 11 therefore comprises a second electrical connection portion 53 which is of a contactless type and which is located axially between the first connection portion 12 of the back pin 11 and the fixing face 5.

In a variant, the driving circuit 43, or any other electrical circuit can be provided with a female connector coaxial with the coupling axis 51, or provided with one or several spring tongues. The back pin 11 of the electrical connector is passing through said female connector before reaching the inner contact 50. Said female connector or said spring tongue, electrically connects the second electrical connection portion 53.

Figure 5:
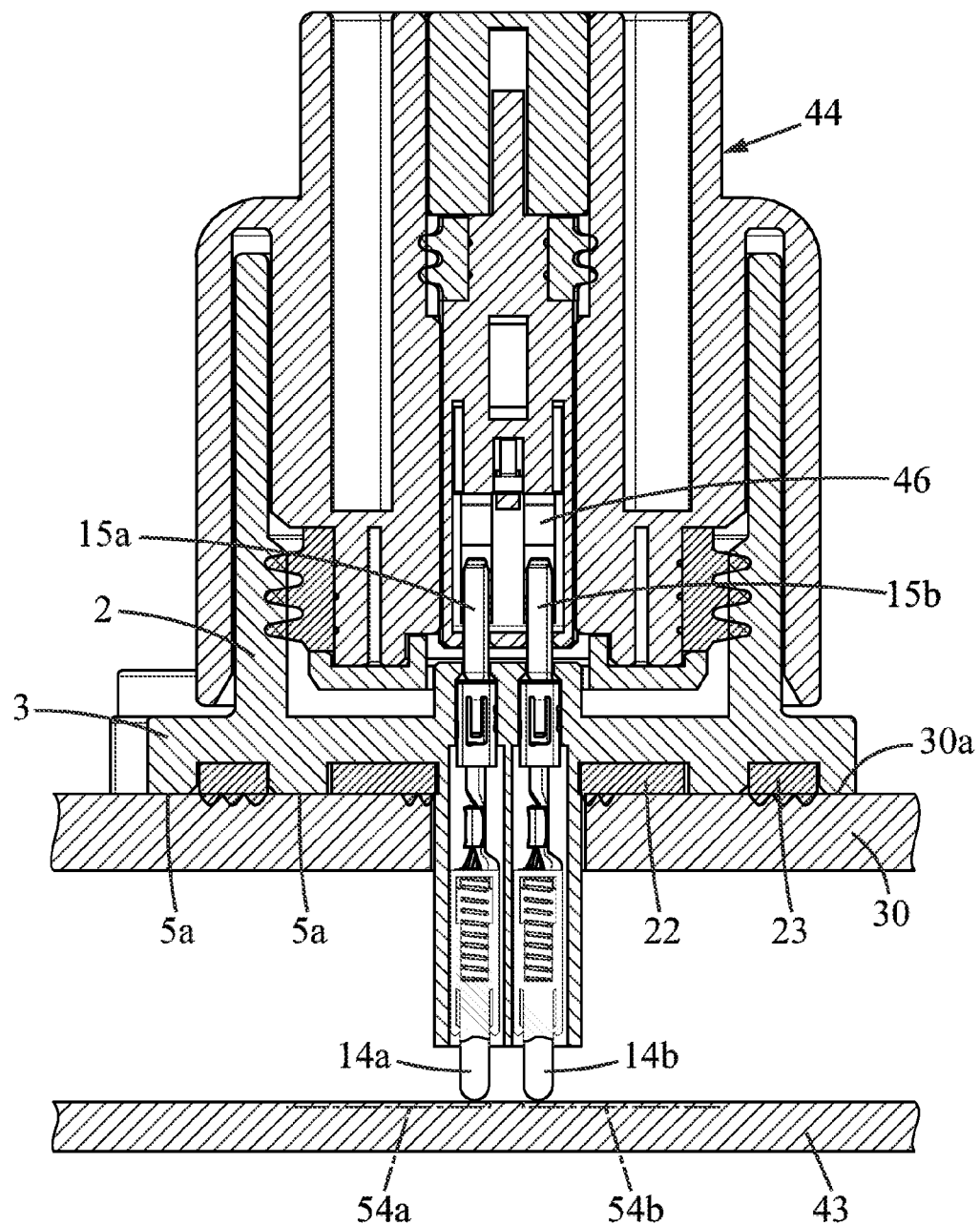
FIG. 5 is a partial longitudinal cut view of the electrical connector according to plane IV-IV of FIG. 1, showing a first variant of an electrical device included in the electrical connector.

As illustrated in FIG. 5, the electrical connector 1 comprises the two identical signals contacts 15a,15b, provided with the spring retractable back pin 14a,14b. When the electrical connector 1 is attached to the mounting surface 30a of the box 41, the back pins 14a,14b are both pressed against the driving circuit 43 while they are both still electrically connected with the corresponding signal contact 15a,15b. The back pin 14a electrically connects a conductive track 54a and the back pin 14b connects another conductive track 54b of the driving circuit.

The complementary connector 14 comprises a shunt device 46 made of a unique conductive metallic sheet including two spring tongues, one connected with the signal contact 15a, the other connected with the other signal contact 15b. Therefore, when the complementary connector 44 mates with the electrical connector 1, the two conductive tracks 54a,54b of the driving circuit 43 are electrically connected to each other. This provides the driving circuit with the information that the complementary connector 44 is in a correct mating position with respect to the electrical connector 1, allowing the power circuit 42 to send or receive electrical power through the power contact 9 and the first complementary power contact 45.

Figure 6:
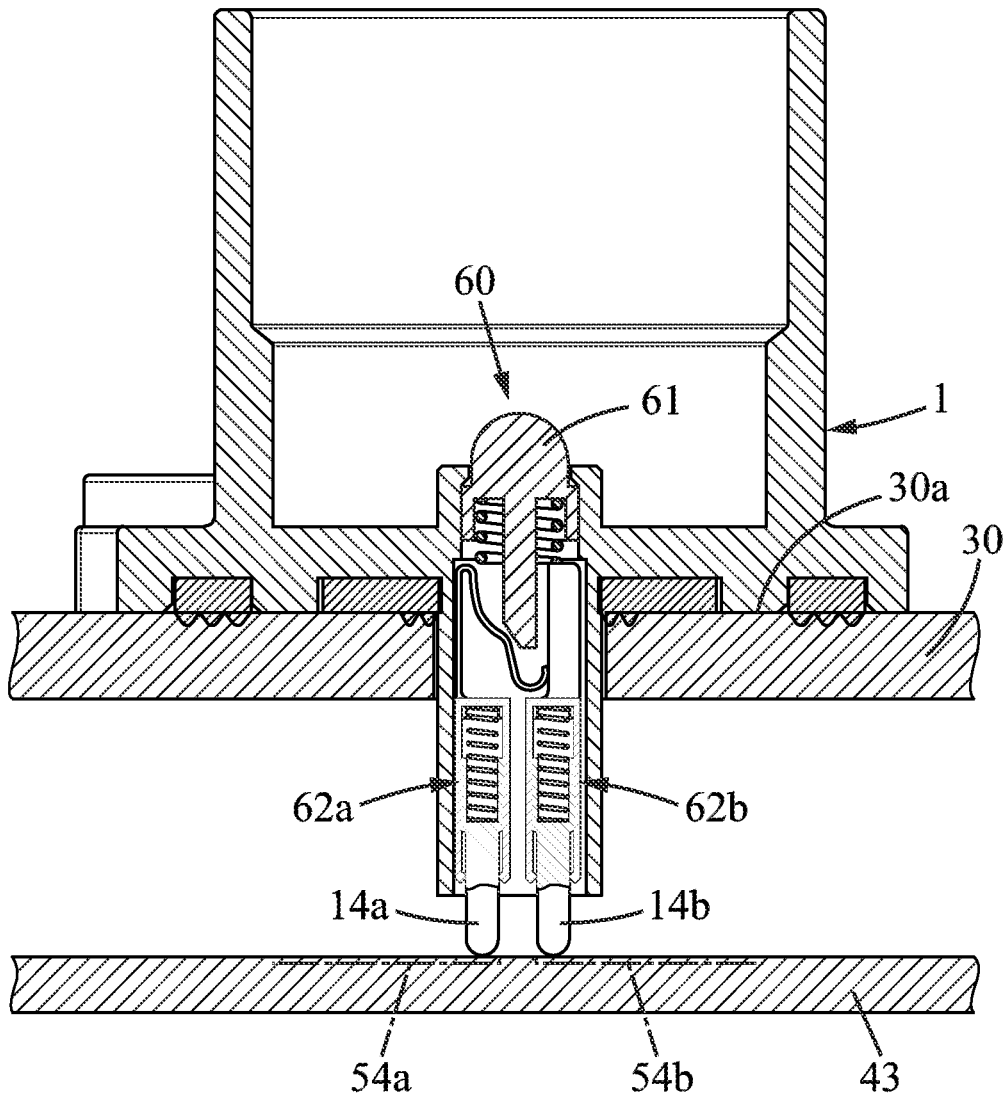
FIG. 6 is a partial longitudinal cut view of the connector according to plane IV-IV of FIG. 1 showing a second variant of the electrical device included in the electrical connector.

As illustrated in FIG. 6, the electrical device included in the electrical connector 1 is a switch 60, comprising a movable actuator 61 and two complementary contacts 62a,62b. The two complementary contacts 62a,62b are electrically connected to each other only when the actuator 61 is pressed down at the end of the mating sequence of the electrical connector 1 with the complementary connector 44. Each of the complementary contacts 62a,62b are spring retractable so as to be blind connectable to the respective conductive tracks 54a,54b of the driving circuit 43 while the electrical connector 1 is mounted on the box 41.

The invention claimed is:

1. An electrical connector, comprising:
    at least one electrical contact having a cross-section larger than 8 mm$^2$ and being adapted to mate with a complementary connector, the at least one contact including a front end adapted to be electrically connected with a first complementary contact of said complementary connector, wherein the at least one electrical contact includes a back pin having a back pin extremity located at the opposite end of the power contact with respect to the front end and adapted to be electrically connected with a second complementary contact of a second connector;
    a main body adapted to mate with the complementary connector and including at least one fixing element which is adapted to be fixed on a mechanical holding structure following a fixing direction; and
    at least one electrical device including an electrical contact pin which is spring retractable following the fixing direction.

2. The electrical connector according to claim 1, wherein said back pin extremity has a smooth longitudinal profile so as to be repeatedly insertable into a female connector including an electrically conductive spring tongue.

3. The electrical connector according to claim 1, wherein said at least one contact has a cross-section larger than 12 mm$^2$.

4. The electrical connector according to claim 3, wherein said at least one contact has a cross-section larger than 16 mm$^2$.

5. The electrical connector according to claim 4, wherein said at least one contact has a cross-section lager than 35 mm$^2$.

6. The electrical connector according to claim 1, wherein said at least one contact has a conductive cross-section between 12 mm$^2$ and 80 mm$^2$.

7. The electrical connector according to claim 6, wherein said at least one contact has a conductive cross-section between 16 mm$^2$ and 65 mm$^2$.

8. The electrical connector according to claim 1, wherein said back pin extremity is adapted to electrically connect the second complementary contact along said fixing direction.

9. The electrical connector according to claim 1, wherein the main body includes one fixing plane along which all of said at least one fixing element extends.

10. The electrical connector according to claim 9, wherein the back pin of said contact has a conductive cross section and protrudes from the fixing plane by a length larger than six times the square root of the conductive cross section.

11. The electrical connector according to claim 9, wherein the fixing direction is perpendicular to the fixing plane.

12. The electrical connector according to claim 9, wherein said back pin extremity which is adapted to connect the second complementary contact is a first connecting portion, the back pin of said power contact including a second connecting portion axially located between the first connecting portion and the fixation plane.

13. The electrical connector according to claim 1, wherein the electrical device is selected from the group consisting of a switch, a shunt device, and a signal contact.

14. Power equipment, comprising:
    a box enclosing an inner space;
    an electrical power circuit included in the inner space;
    an electrical power contact which is electrically connected to the power circuit and connectable following a coupling axis with another power contact, the box including a wall provided with a through hole and attaching means adapted to attach an electrical connector body, said attaching means extending around the through hole, wherein the electrical power contact is an inner electrical power contact located inside the inner space and the coupling axis is passing through the through hole; and
    an electrical circuit electrically connected with said electrical power circuit, wherein said electrical circuit includes a ring sensor which is coaxial with the coupling axis of the inner electrical power contact.

15. The power equipment according to claim 14, wherein the wall portion about the through hole extends continuously all around the through hole so as to be included in a single piece part.

16. Power equipment, comprising:
    a box enclosing inner space;
    an electrical power circuit included in the inner space;
    an electrical power contact which is electrically connected to the power circuit and connectable following a coupling axis with another power contact, the box including a wall provided with a through hole and attaching means adapted to attach an electrical connector body, said attaching means extending around the through hole, wherein the electrical power contact is an inner electrical power contact located inside the inner space and the coupling axis is passing through the through hole, wherein the electrical power circuit includes Insulated Gate Bipolar Transistors (IGBT).

17. Power equipment according to claim 16, wherein the wall portion about the through hole extends continuously all around the through hole so as to be included in a single piece part.

18. A power equipment assembly, comprising:
    an electrical connector having at least one electrical contact having a cross-section larger than 8 mm$^2$ and being adapted to mate with a complementary connector, the at least one contact including a front end adapted to be electrically connected with a first complementary contact of said complementary connector, wherein the at least one electrical contact includes a back pin having a back pin extremity located at the opposite end of the power contact with respect to the front end and adapted to be electrically connected with a second complementary contact of a second connector;

a box enclosing an inner spacer;

an electrical power circuit included in the inner space; and an electrical power contact which is electrically connected to the power circuit and connectable following a coupling axis with another power contact, the box including a wall provided with a through hole and attaching means adapted to attach an electrical connector body, said attaching means extending around the through hole, characterized in that the electrical power contact is an inner electrical power contact located inside the inner space and the coupling axis is passing through the through hole, wherein said second complementary power contact is the inner electrical power contact of the power equipment and said another power contact is the back pin extremity.

19. The power equipment assembly according to claim 18, wherein the electrical connectors includes at least one electrical device including an electrical contact pin which is spring retractable and pressed against an electrical circuit of the power equipment so as to provide an electrical connection between said electric device and said electrical circuit.

* * * * *